US012643190B2

(12) United States Patent
Kawakami et al.

(10) Patent No.: US 12,643,190 B2
(45) Date of Patent: Jun. 2, 2026

(54) GRINDING TOOL

(71) Applicant: MAKITA CORPORATION, Anjo (JP)

(72) Inventors: Takahiro Kawakami, Anjo (JP); Yu Eto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 508 days.

(21) Appl. No.: 17/876,055

(22) Filed: Jul. 28, 2022

(65) Prior Publication Data

US 2023/0062495 A1 Mar. 2, 2023

(30) Foreign Application Priority Data

Sep. 1, 2021 (JP) ................................ 2021-142724
Dec. 10, 2021 (JP) ................................ 2021-201102

(51) Int. Cl.

*B24B 23/02* (2006.01)
*B24B 27/08* (2006.01)
*B24B 41/00* (2006.01)
*B25F 5/00* (2006.01)

(52) U.S. Cl.

CPC ............ *B24B 23/028* (2013.01); *B24B 27/08* (2013.01); *B24B 41/007* (2013.01); *B25F 5/006* (2013.01)

(58) Field of Classification Search

CPC ....... B24B 23/028; B24B 23/02; B24B 27/08; B24B 41/007; B25F 5/006
USPC ................................................. 451/359, 451
See application file for complete search history.

(56) References Cited

U.S. PATENT DOCUMENTS 5,466,183 A * 11/1995 Kirn .......................... B25F 5/02 30/518
9,954,418 B2 * 4/2018 Kawakami ............ B24B 23/028
9,993,937 B2 * 6/2018 Wolf ........................ B27B 17/00
2008/0223594 A1 * 9/2008 Eisenhardt .............. B25F 5/006 173/162.2
2008/0274675 A1 * 11/2008 Chen ......................... B24B 3/52 451/178
2009/0321101 A1 12/2009 Furusawa et al.
2012/0118599 A1 * 5/2012 Schadow ................ B25F 5/006 173/162.2
2012/0129435 A1 * 5/2012 Ikuta ....................... B25F 5/006 451/358

(Continued)

FOREIGN PATENT DOCUMENTS

CN 107042495 A 8/2017
DE 10 2016 215 660 A1 2/2018

(Continued)

OTHER PUBLICATIONS

English Translation of DE-102020115037-A1 (Year: 2020).*

(Continued)

*Primary Examiner* — Makena S Markman
(74) *Attorney, Agent, or Firm* — Oliff PLC

(57) ABSTRACT

A grinding tool allows effective reduction of vibration while maintaining the compact product size. A grinding tool includes a motor housing accommodating a motor, a pair of housing halves screwed together across the motor housing and each including a screw boss extending through the motor housing, and an elastic member between the motor housing and each of the screw bosses in an axial direction of the screw bosses.

17 Claims, 16 Drawing Sheets

(56) References Cited

U.S. PATENT DOCUMENTS

| | | | | |
|---|---|---|---|---|
| 2015/0367495 | A1* | 12/2015 | Takeda | B24B 41/007 451/359 |
| 2017/0225316 | A1* | 8/2017 | Iwakami | B25F 5/02 |
| 2018/0319001 | A1* | 11/2018 | Zhong | B25F 5/006 |
| 2020/0266679 | A1* | 8/2020 | Fujii | H01R 39/381 |
| 2020/0384597 | A1 | 12/2020 | Numata | |

FOREIGN PATENT DOCUMENTS

| | | | | |
|---|---|---|---|---|
| DE | 102020115037 | A1 * | 12/2020 | B24B 23/005 |
| EP | 2 251 151 | A1 | 11/2010 | |
| JP | 2010-005733 | A | 1/2010 | |
| JP | 2020-199627 | A | 12/2020 | |

OTHER PUBLICATIONS

Palaver DE-102016215660-A1 English Translation (Year: 2018).*

Apr. 22, 2025 Office Action issued in Japanese Application No. 2021-201102.

Jan. 19, 2026 Office Action issued in Chinese Patent Application No. 202210689066.0.

* cited by examiner

GRINDING TOOL

CROSS-REFERENCE TO RELATED APPLICATIONS

This application claims the benefit of priority to Japanese Patent Application No. 2021-142724, filed on Sep. 1, 2021, and Japanese Patent Application No. 2021-201102, filed on Dec. 10, 2021, the entire contents of which are hereby incorporated by reference.

BACKGROUND

1. Technical Field

The present disclosure relates to a grinding tool such as a grinder. In one or more embodiments of the present disclosure, grinding includes polishing.

2. Description of the Background

Grinding tools such as grinders have a structure to reduce vibration during operation. For example, European Patent Application Publication No. 2251151 (hereafter, Patent Literature 1) describes a structure including a handle including a left and right housing halves screwed onto a motor housing accommodating a motor, and a cylindrical vibration damper placed between a screw boss on the handle and a receiver on the motor housing.

BRIEF SUMMARY

In the vibration isolation structure described in Patent Literature 1, a vibration damper externally attached to the screw boss causes a screw fastening portion to be larger in the radial direction. This may increase the product size.

One or more aspects of the present disclosure are directed to a grinding tool that allows effective reduction of vibration while maintaining the compact product size.

A first aspect of the present disclosure provides grinding tool, including:

- a motor housing accommodating a motor;
- a pair of housing halves screwed together across the motor housing, each of the housing halves including a screw boss extending through the motor housing; and
- an elastic member between the motor housing and each of the screw bosses in an axial direction of the screw bosses.

A second aspect of the present disclosure provides grinding tool, including:

- a motor housing accommodating a motor;
- a pair of housing halves screwed together across the motor housing;
- a shaft having two ends including threaded portions, the shaft extending through the motor housing;
- a pair of nuts held in the pair of housing halves and screwed onto the threaded portions; and
- an elastic member between the motor housing and each of the pair of housing halves.

The structure according to the above aspect of the present disclosure allows effective reduction of vibration while maintaining the compact product size.

DETAILED DESCRIPTION

First Embodiment

A first embodiment will now be described with reference to the drawings.

Figure 1:
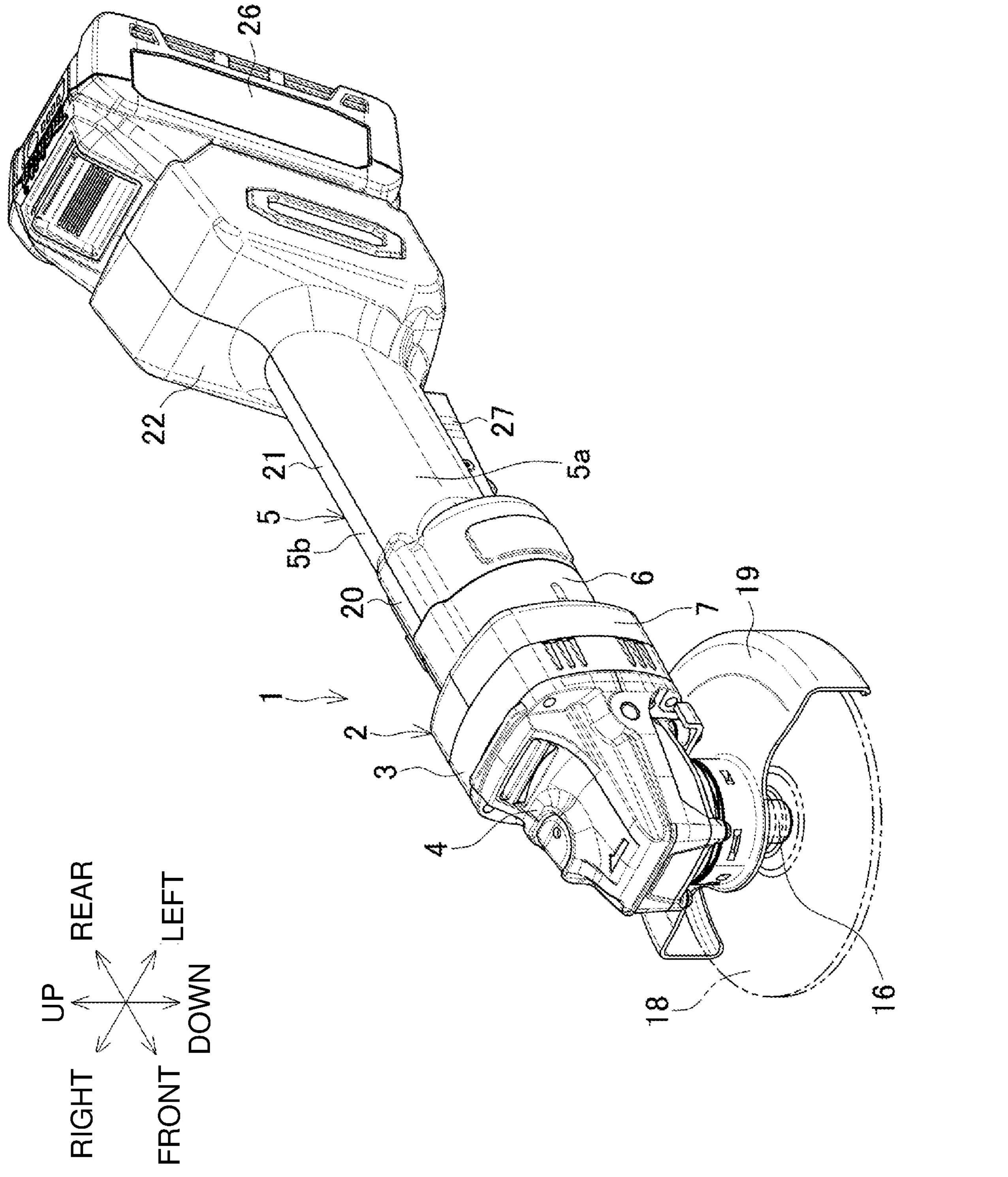
FIG. 1 is a perspective view of a grinder according to a first embodiment.
Figure 2:
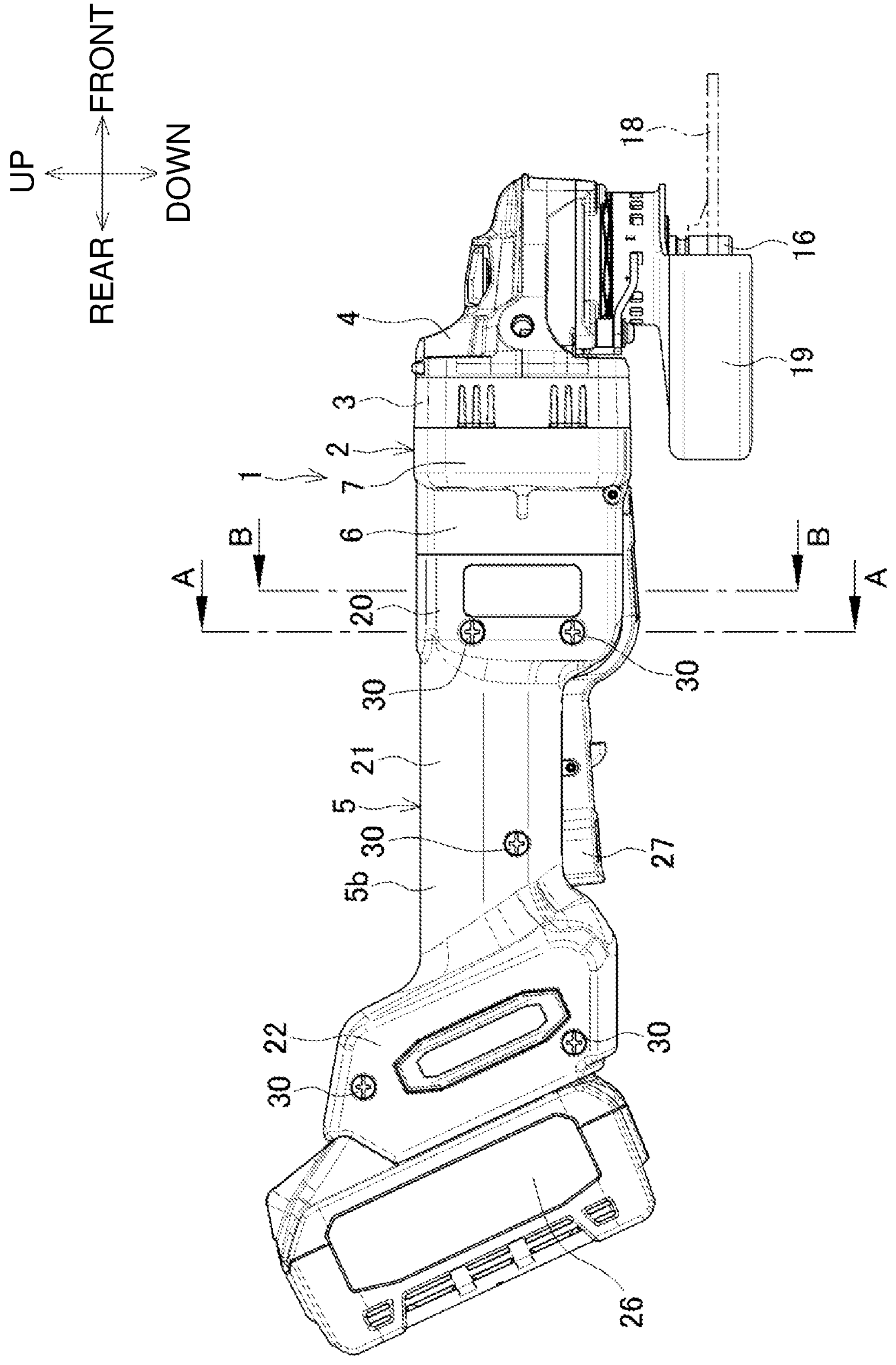
FIG. 2 is a side view of the grinder according to the first embodiment.
Figure 3:
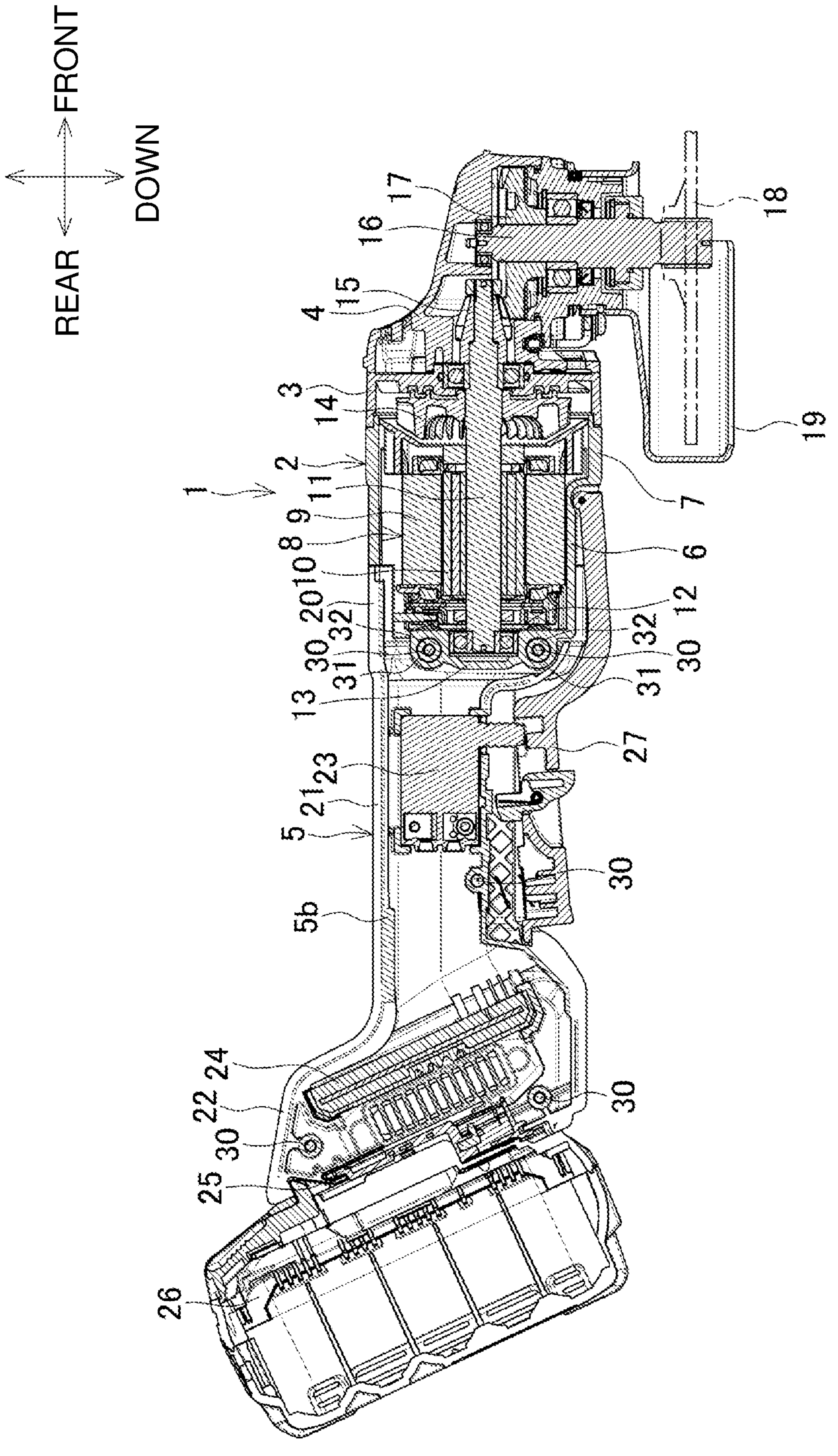
FIG. 3 is a longitudinal central sectional view of the grinder according to the first embodiment.

FIG. 1 is a perspective view of a grinder 1 as an example of a grinding tool. FIG. 2 is a side view of the grinder 1. FIG. 3 is a longitudinal central sectional view of the grinder 1.

The grinder 1 includes a motor housing 2 extending in the front-rear direction. A middle housing 3 is joined to the front of the motor housing 2. The middle housing 3 is rectangular as viewed from the front. A gear housing 4 is joined to the front of the middle housing 3. A grip housing 5 is joined to the rear of the motor housing 2. The grip housing 5 extends in the front-rear direction.

The motor housing 2 includes a cylindrical rear housing 6 and a square front housing 7 as viewed from the front. The rear housing 6 accommodates a motor 8. The front housing 7 is connected to the gear housing 4, with the middle housing 3 in between, with screws (not shown) that are screwed in from the front of the gear housing 4.

The motor 8 is an inner-rotor brushless motor including a cylindrical stator 9 and a rotor 10. The rotor 10 extends through the stator 9. The stator 9 is accommodated in the rear housing 6. The rotor 10 includes a rotational shaft 11 along its axis. The rotational shaft 11 extends in the front-rear direction. The rotational shaft 11 has its rear end supported in a rear portion of the rear housing 6 with a bearing 12 in between. A bearing retainer 13 protrudes at the center of the rear surface of the rear housing 6. The bearing retainer 13 is circular as viewed from the rear and holds the bearing 12. The rotational shaft 11 has its front portion protruding into the gear housing 4 through the front housing 7 and the middle housing 3. A fan 14 is fixed to the rotational shaft 11 in the middle housing 3. A first bevel gear 15 is fixed to the front end of the rotational shaft 11 in the gear housing 4.

A spindle 16 is axially supported in the gear housing 4. The spindle 16 protrudes downward. A second bevel gear 17 is fixed to the spindle 16. The second bevel gear 17 meshes with the first bevel gear 15.

A disk-shaped tip tool (e.g., a grinding wheel) 18 is attached to the lower end of the spindle 16 in the direction orthogonal to the spindle 16. The gear housing 4 receives a wheel cover 19 in its lower portion. The wheel cover 19 is semicircular as viewed in plan and covers the rear of the tip tool 18 from above and behind.

The grip housing 5 includes a front grip 20, a middle grip 21, and a rear grip 22. The front grip 20 flares frontward and is joined to an outer portion of the rear housing 6 in the motor housing 2. The middle grip 21 has a smaller diameter than the front grip 20. The middle grip 21 accommodates a switch 23. The rear grip 22 flares rearward. The rear grip 22 accommodates a controller 24 and a terminal mount 25. A battery pack 26 that serves as a power supply is attached to the rear grip 22.

A switch lever 27 is located in lower portions of the motor housing 2 and the grip housing 5. The switch lever 27 has a front end connected to the lower surface of the rear housing 6 in a rotatable manner. The switch lever 27 extends rearward to the lower surface of the middle grip 21. The switch lever 27 is pushed upward to turn on the switch 23.

The grip housing 5 includes left and right housing halves **5*a* and 5*b*. Multiple screws 30 are screwed into the left housing half 5*a* from the right of the right housing half 5*b* to connect the housing halves 5*a* and 5*b* together. The screws are placed in the front grip at vertically two positions, in the middle grip 21 at one position, and in the rear grip 22** at vertically two positions.

Figure 4:
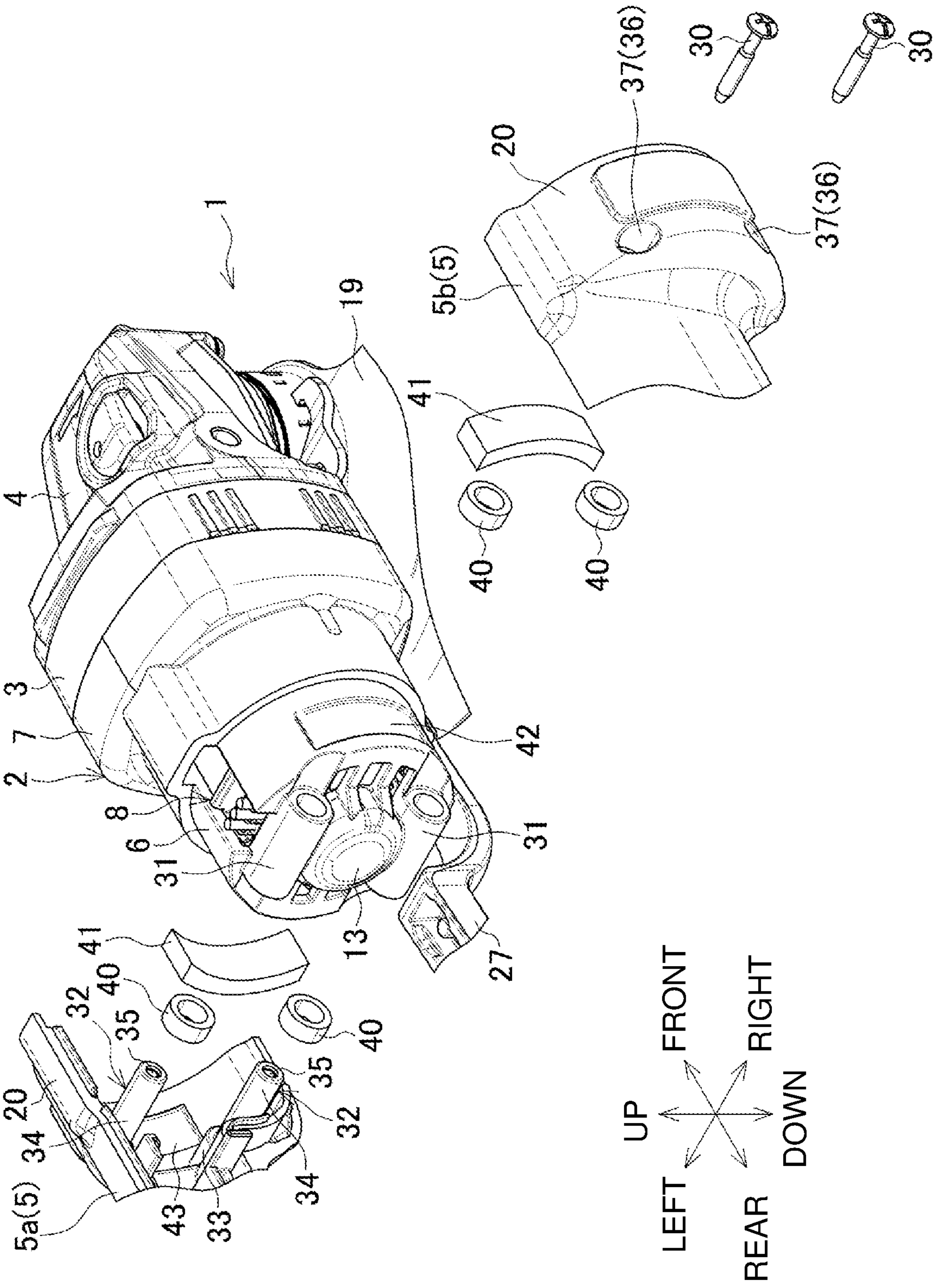
FIG. 4 is an exploded perspective view of screw fastening portions of a front grip.
Figure 5:
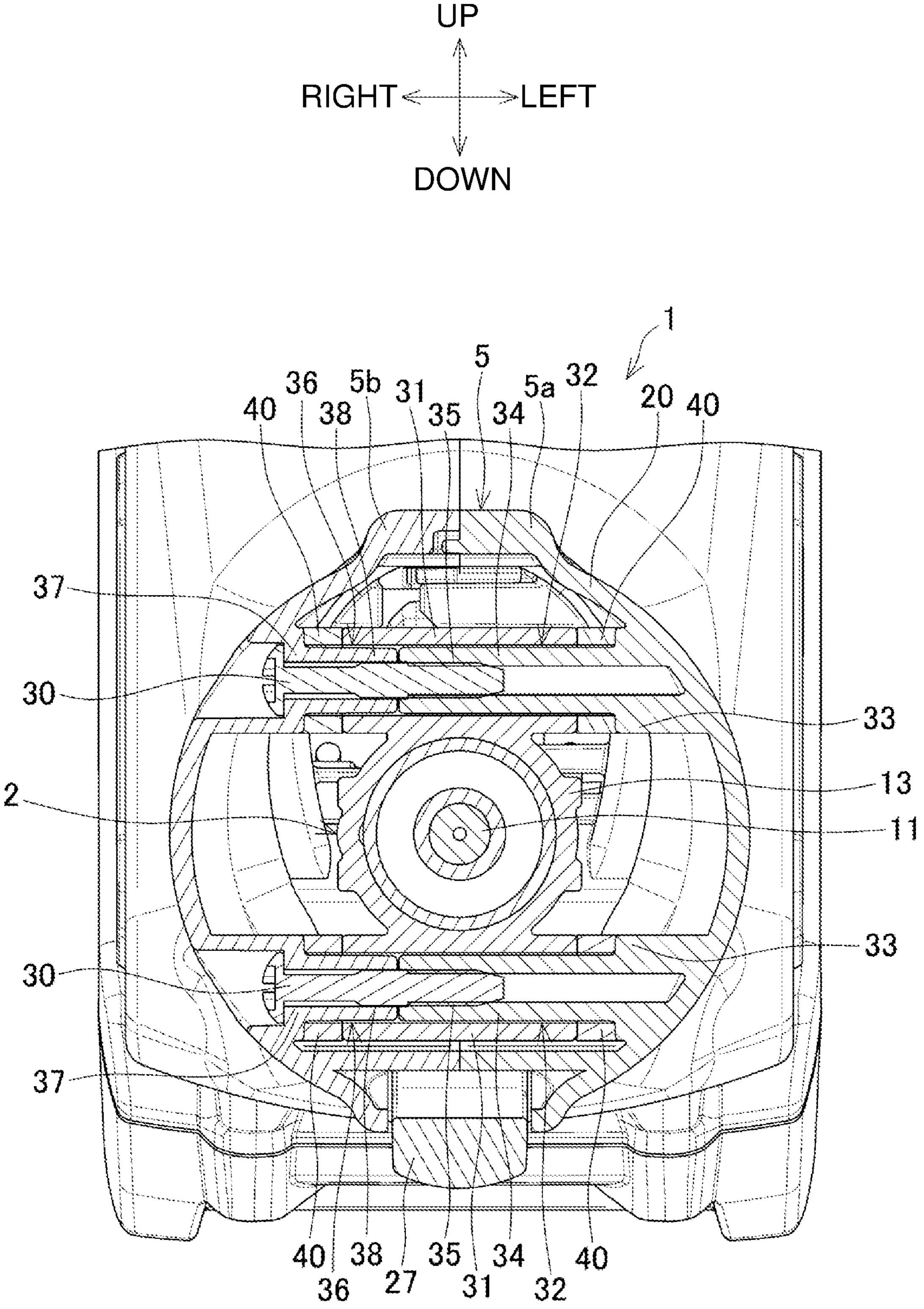
FIG. 5 is an enlarged sectional view taken along line A-A in FIG. 2.

As shown in FIGS. 4 and 5, a pair of upper and lower guide cylinders 31 are integral with the rear surface of the rear housing 6 at the screw fastening positions on the front grip 20. The guide cylinders 31 each extend laterally with a uniform diameter. The guide cylinders 31 are located above and below the bearing retainer 13 and overlap the bearing 12 and the bearing retainer 13 in the vertical direction.

In the front grip 20, a pair of upper and lower left screw bosses 32 are integral on the inner surface of the left housing half **5*a*. Each left screw boss 32 is coaxial with the corresponding guide cylinder 31 and protrudes rightward. Each left screw boss 32 is cylindrical and has a stepped-diameter with a left larger-diameter portion 33 on the left near its basal end and a left smaller-diameter portion 34 on the right. The left larger-diameter portions 33 have the same diameter as the guide cylinders 31. The left smaller-diameter portions 34 each have an outer diameter to be loosely received in the corresponding guide cylinder 31. Each left smaller-diameter portion 34 has an internal thread 35 on its inner surface. Each left smaller-diameter portion 34 extends rightward beyond the middle of the front grip 20** in the lateral direction.

A pair of upper and lower right screw bosses 36 are on the inner surface of the right housing half **5*b*. Each right screw boss 36 is coaxial with the corresponding guide cylinder 31 and protrudes leftward. Each right screw boss 36 is cylindrical and has a stepped-diameter with a right larger-diameter portion 37 on the right near its basal end and a right smaller-diameter portion 38 on the left. The right larger-diameter portions 37 have the same diameter as the guide cylinders 31 and are open on the right side surface of the housing half 5*b*. The right smaller-diameter portions 38 each have an outer diameter to be loosely received in the corresponding guide cylinder 31. The right smaller-diameter portions 38 are shorter than the left smaller-diameter portions 34**.

In the front grip 20, the left and right housing halves **5*a* and 5*b* are assembled together with the left smaller-diameter portions 34 of the upper and lower left screw bosses 32 placed in the guide cylinders 31 from the left and the right smaller-diameter portions 38 of the upper and lower right screw bosses 36 are placed in the guide cylinders 31 from the right. In this state, the end faces of each left smaller-diameter portion 34 and the corresponding right smaller-diameter portion 38 are close to or in contact with each other in the corresponding guide cylinder 31. In this state, the left larger-diameter portions 33 and the right larger-diameter portions 37 are not in contact with and are separate from the end faces of the corresponding guide cylinders 31** in the lateral direction.

Rubber rings 40 are externally mounted on the left smaller-diameter portions 34 of the left screw bosses 32 and on the right smaller-diameter portions 38 of the right thread bosses 36. Each rubber ring 40 has the same outer diameter as the guide cylinder 31. Each rubber ring 40 has an axial length, in an assembled state, slightly longer than the distance between the corresponding guide cylinder 31 and either the left larger-diameter portion 33 or the right larger-diameter portion 37 in the lateral direction.

To fasten the front grip 20 by screwing, the screws 30 are placed in the openings of the right larger-diameter portions 37 of the right screw bosses 36 from the right. The screws 30 are then screwed onto the internal threads 35 on the left smaller-diameter portions 34 of the left screw bosses 32. The left and right rubber rings 40 on each guide cylinder 31 are then compressed between the corresponding left larger-diameter portion 33 and right larger-diameter portion 37 in the axial direction. The left screw bosses 32 and the right screw bosses 36 are screwed together with the rubber rings 40 between the left screw bosses 32 and the guide cylinders 31 and between the right screw bosses 36 and the guide cylinders 31. At screw fastening positions other than on the front grip 20, the left screw bosses 32 and the right screw bosses 36 are screwed in the same manner but without the guide cylinders 31 or the rubber rings 40.

Figure 6:
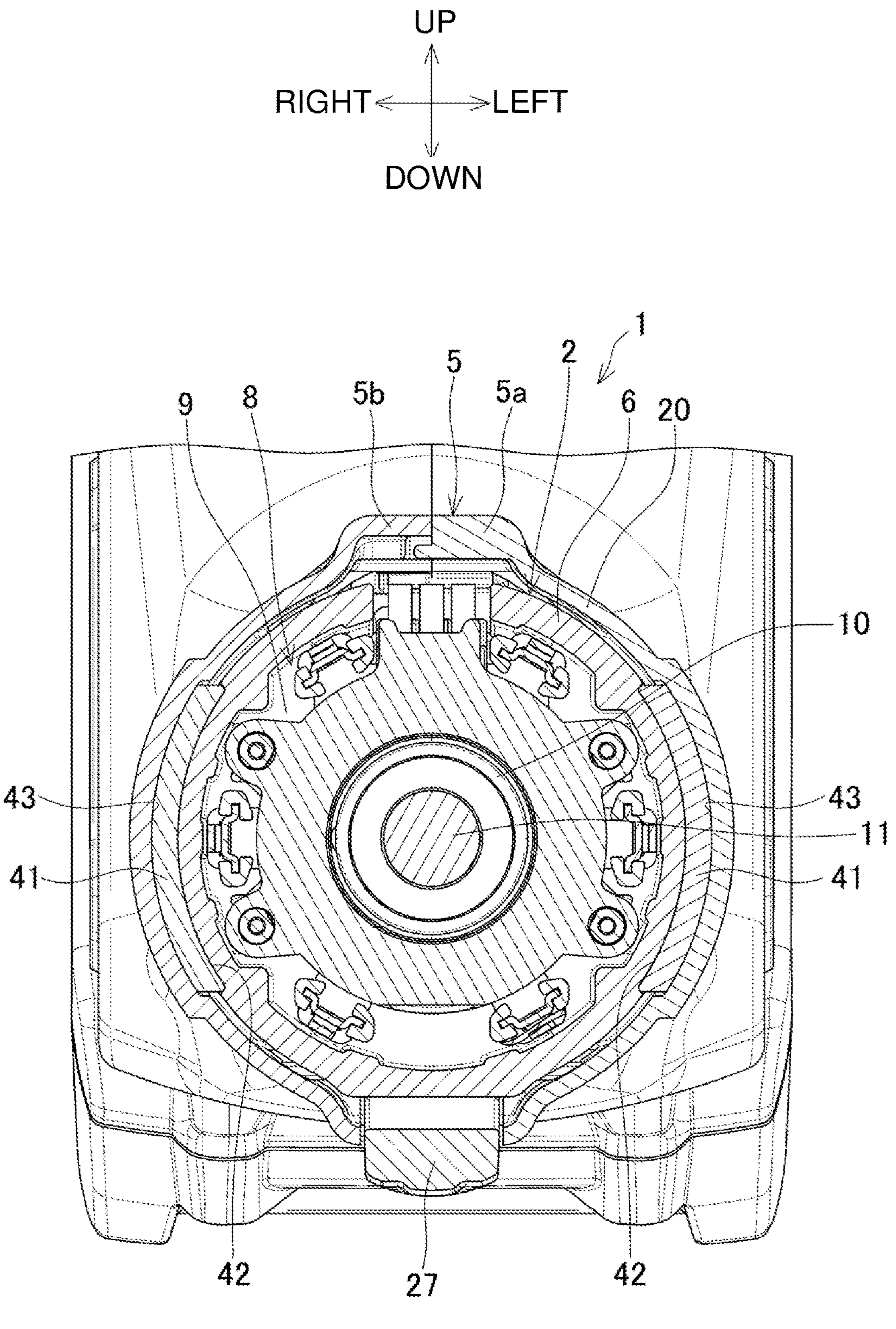
FIG. 6 is an enlarged sectional view taken along line B-B in FIG. 2.

As shown in FIG. 6 as well, a pair of left and right rubber sheets 41 are between the rear housing 6 and the front grip 20 in front of the screw fastening positions on the front grip 20. The rubber sheets 41 are strip plates extending in the circumferential direction of the rear housing 6. A pair of inner recesses 42 are formed on the left and right outer peripheral surfaces of the rear housing 6. Each inner recess 42 extends circumferentially in conformance with the outer shape of the corresponding rubber sheet 41. A pair of outer recesses 43 are formed on the left and right inner peripheral surfaces of the front grip 20. Each outer recess 43 extends circumferentially in conformance with the outer shape of the corresponding rubber sheet 41. Each rubber sheet 41 fits between the corresponding inner recess 42 and outer recess 43 and is positioned between the rear housing 6 and the front grip 20. Each rubber sheet 41 is compressed radially between the corresponding inner recess 42 and outer recess 43 when the front grip 20 is assembled.

The rear housing 6 and the front grip 20 are thus assembled with the rubber rings 40 and the rubber sheets 41 in between.

The switch lever 27 is pushed in with the hand gripping the middle grip 21 of the grip housing 5 to turn on the switch 23. The controller 24 then supplies a drive current to the stator 9 in the motor 8 to rotate the rotor 10. The rotation of the rotational shaft 11 is thus transmitted to the spindle 16 with the first and second bevel gears 15 and 17, rotating the tip tool 18. The rotating tip tool 18 can grind a workpiece.

During operation, the tip tool 18 and the motor 8 may cause vibration. However, the rubber rings 40 and the rubber sheets 41 are between the motor housing 2 and the grip housing 5 to reduce any vibration transmitted to grip housing 5. This allows the operator to feel less discomfort in the hand from such vibration.

In particular, the rubber rings 40 are located between each of the guide cylinders 31 in the motor housing 2 and either the corresponding left screw boss 32 or right screw boss 36 in the grip housing 5 in the axial direction of the left and right screw bosses 32 and 36. This reduces the likelihood that the screw fastening portions are to be larger in the radial direction with the rubber rings 40.

The grinder 1 according to the first embodiment includes the motor housing 2 accommodating the motor 8 and the pair of housing halves 5*a* and 5*b* screwed together across the motor housing 2. The housing halves 5*a* and 5*b* include the left screw bosses 32 and the right screw bosses 36 (screw bosses) that extend through the guide cylinders 31 in the motor housing 2. The grinder 1 includes the rubber rings 40 (elastic members) between each of the guide cylinders 31 and the corresponding left screw boss 32 or right screw boss 36 in the axial direction of the left and right screw bosses 32 and 36.

This structure allows effective reduction of vibration while maintaining the compact product size.

The grinder 1 includes the spindle 16 (output shaft) in front of the motor housing 2. The housing halves 5*a* and 5*b* are a pair of left and right housings. The axial direction of the left and right screw bosses 32 and 36 is the lateral direction of the motor housing 2.

This allows the rubber rings 40 to be securely sandwiched between the assembled left and right housing halves 5*a* and 5*b*.

The rubber rings 40 are located on the left and right of the guide cylinders 31. This structure produces a laterally balanced vibration reduction effect.

The housing half 5*a* includes the two left screw bosses 32, and the housing half 5*b* includes the two right screw bosses 36 in the vertical direction of the motor housing 2.

This structure produces a vertically balanced vibration reduction effect.

The motor housing 2 is cylindrical.

This enhances the unity between the motor housing 2 and the housing halves 5*a* and 5*b*.

The rubber sheet 41 (second elastic member) is between each of the housing halves 5*a* and 5*b* and the motor housing 2 on the left and right of the motor housing 2.

This structure produces a higher vibration reduction effect.

In the first embodiment, the screw fastening positions on the front grip are not limited to the two positions in the vertical direction. The screw fastening positions may be at one, three, or more positions. The screw fastening position is not limited to the rear surface of the motor housing, but may be on the upper or lower surface of the motor housing. The screwing direction may be reversed in the lateral direction. The lengths of the left and right screw bosses may also be reversed, or the lengths of the left and right screw bosses may be the same.

The length and the diameter of the rubber ring between each guide cylinder and the corresponding left screw boss or right screw boss can be changed as appropriate in accordance with the distance between each guide cylinder and the corresponding left screw boss or right screw boss. Multiple rubber rings may be stacked in the axial direction. The elastic member may be formed from a material other than rubber.

In the first embodiment, the rubber rings are located at the screw fastening positions on the front grip alone, but the elastic member as the rubber ring may be located at other screw fastening positions on, for example, the middle grip.

The rubber sheets may be located vertically instead of or in addition to being located laterally. The second elastic member may be formed from a material other than rubber. However, the second elastic member may be eliminated.

Second Embodiment

A second embodiment will now be described. The same reference numerals denote the same components in the first embodiment. Such components will not be described repeatedly.

Figure 7:
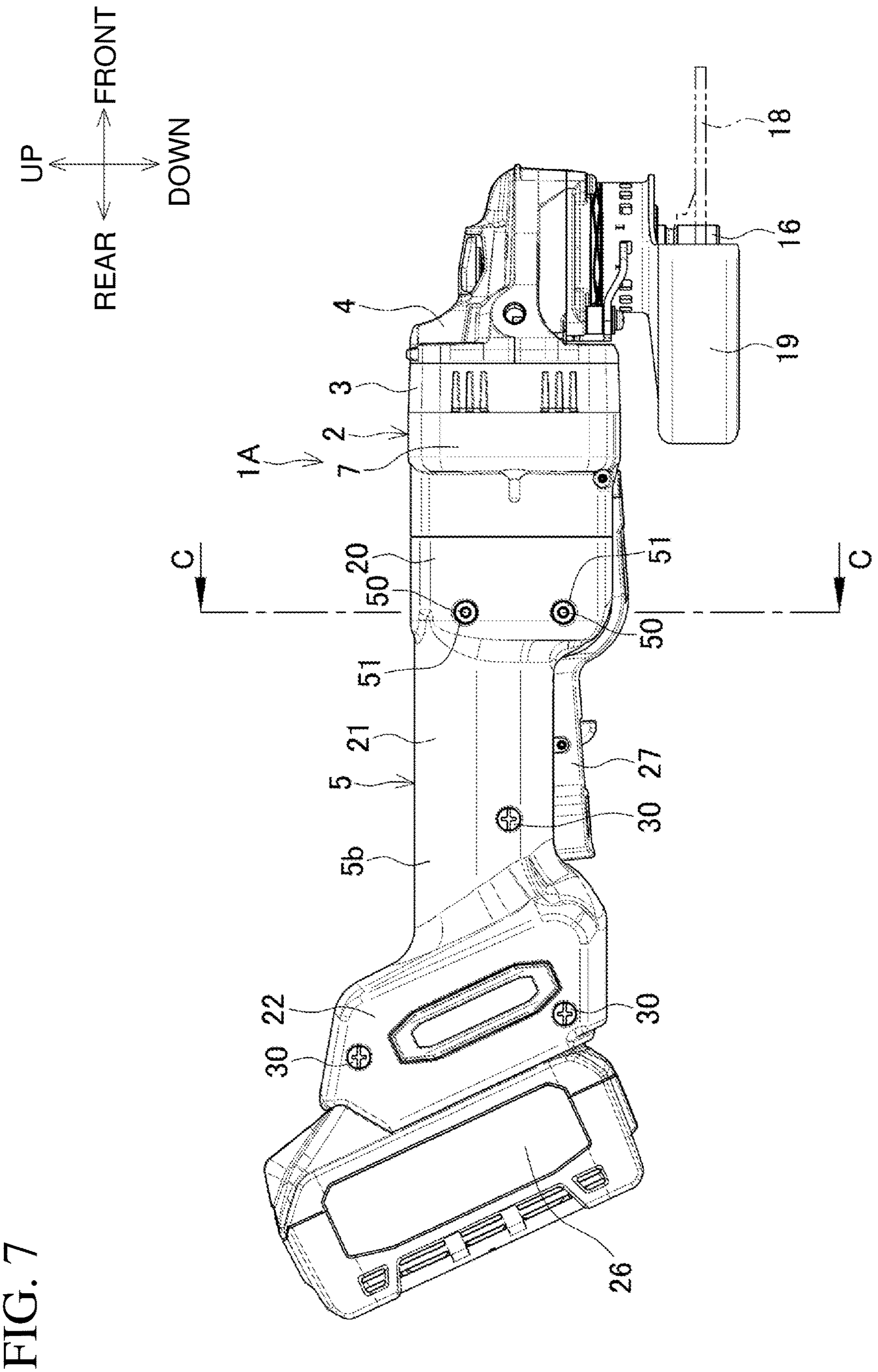
FIG. 7 is a side view of a grinder according to a second embodiment.
Figure 8:
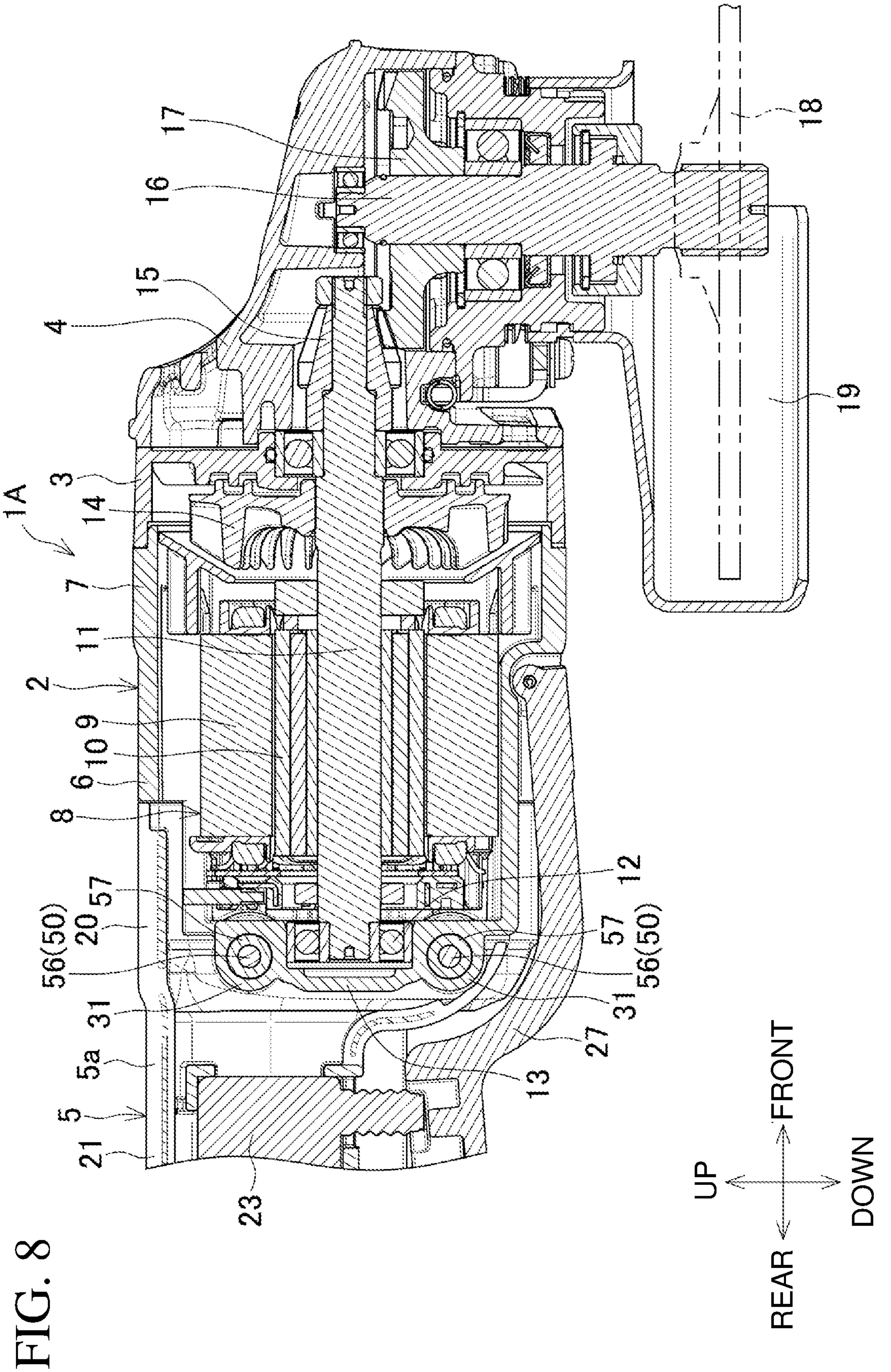
FIG. 8 is a longitudinal partial central sectional view of the grinder according to the second embodiment.
Figure 9:
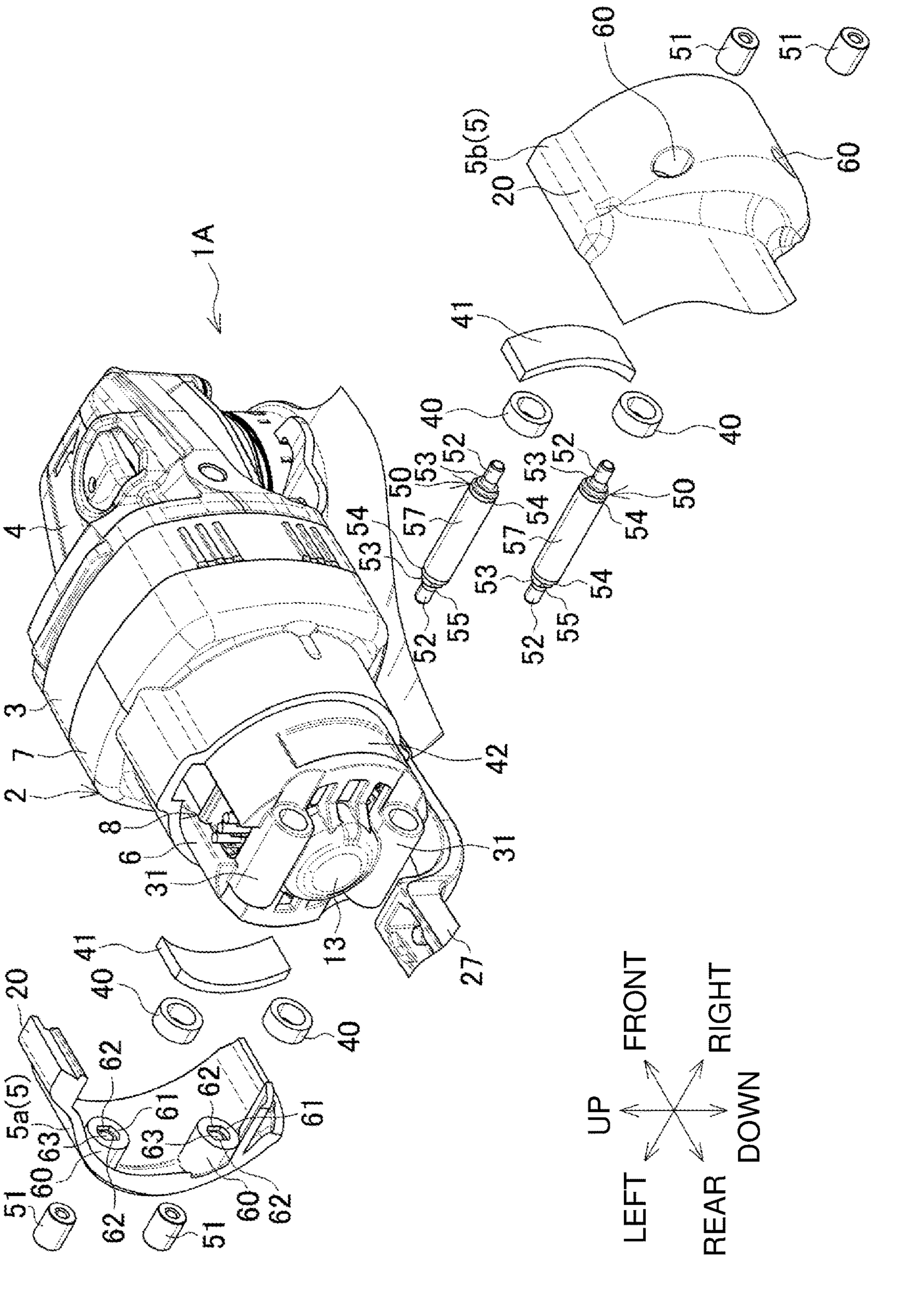
FIG. 9 is an exploded perspective view of screw fastening portions of a front grip.

FIG. 7 is a side view of a grinder 1A. FIG. 8 is a longitudinal partial sectional view of the grinder 1A. FIG. 9 is an exploded perspective view of screw fastening portions of a front grip of the grinder 1A.

In the grinder 1A as well, the front grip 20 is also screwed at two positions in the vertical direction. Shafts 50 and nuts 51 are used in the present embodiment instead of screw bosses and screws. The shafts 50 are placed in the guide cylinders 31. The nuts 51 are held on the left and right housing halves 5*a* and 5*b*.

Figure 10:
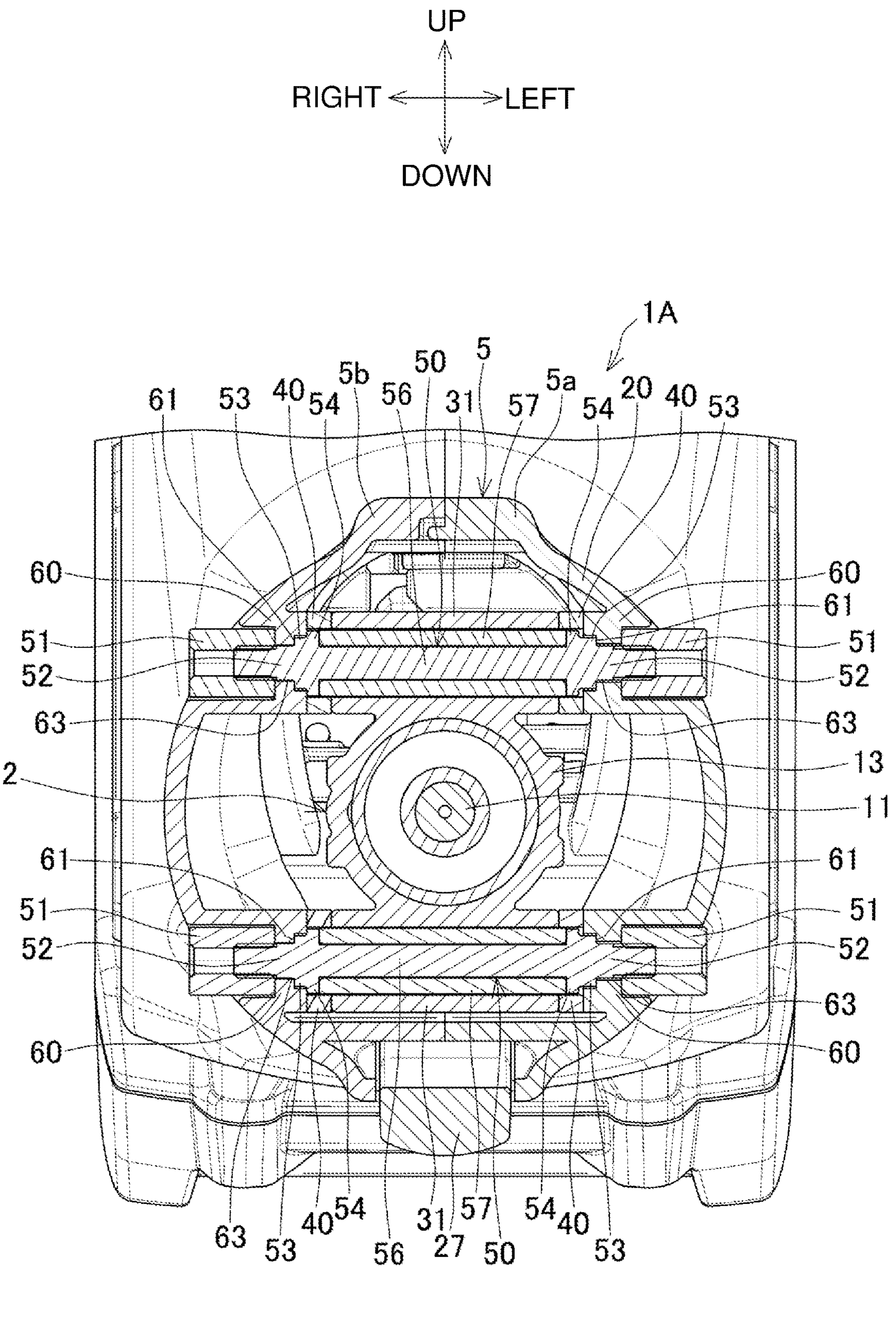
FIG. 10 is an enlarged cross-sectional view taken along line C-C in FIG. 7.

The shafts 50 are formed from metal and includes the threaded portions 52 on the left and right ends. Each threaded portion 52 includes a medium-diameter portion 53 and a flange 54 at laterally inward end. As shown in FIG. 10 as well, the medium-diameter portions 53 and the flanges 54 have diameters increasing in a stepwise manner toward the middle in the lateral direction. The left medium-diameter portion 53 includes flat edges 55. A narrow-diameter portion 56 with the same diameter as the threaded portion 52 is between the left and right flanges 54. A rubber sleeve 57 is externally mounted on the narrow-diameter portion 56. The rubber sleeve 57 has the same outer diameter as the flange 54. The shafts 50 are placed in the corresponding guide cylinders 31 together with the rubber sleeves 57. In this state, each shaft 50 has its ends protruding leftward and rightward from the left and right ends of the rubber sleeve 57 through the corresponding guide cylinder 31.

The housing halves 5*a* and 5*b* include receivers 60. Each receiver 60 is coaxial with the corresponding shaft 50. The receiver 60 is cylindrical. The receiver 60 protrudes inward and is open outward in the lateral direction. The receiver 60 has, in its inward portion, the same outer diameter as the guide cylinder 31. Each receiver 60 has a blind hole 61 in its inward portion. The blind hole 61 receives the medium-diameter portion 53 of the corresponding shaft 50. The blind hole 61 on the left includes flat edges 62. The flat edges 62 fit the flat edges 55 on the left medium-diameter portion 53. The blind hole 61 has a through-hole 63 at its bottom center. The threaded portion 52 extends through the through-hole 63.

To assemble the left and right housing halves 5*a* and 5*b* together, the left flat edge 55 on each shaft 50 are fitted with the flat edge 62 on the corresponding receiver 60. The left and right threaded portions 52 of each shaft 50 are locked in a nonrotatable manner and protrude into the corresponding receivers 60. In this state, the left and right receivers 60 are not in contact with the ends of the guide cylinders 31 and are separate in the lateral direction.

Each rubber ring 40 is externally mounted on the corresponding shaft 50 on the left or the right between the guide cylinder 31 and either the left receiver 60 or the right receiver 60. Each rubber ring 40 has an axial length, in an assembled state, slightly longer than the distance between the corresponding guide cylinder 31 and either the left receiver 60 or the right receiver 60 in the lateral direction.

The nuts 51 are placed in the left and right receivers 60 from outside. Each nut 51 is screwed onto the corresponding threaded portion 52 protruding into the receiver 60. The left and right housing halves 5*a* and 5*b* are then pressed against the left and right medium-diameter portions 53 of the shafts 50. This fastens the left and right housing halves 5*a* and 5*b*. In this state, the rubber rings 40 on the left and right of the guide cylinders 31 are compressed between the left and right receivers 60 in the axial direction. Each rubber ring 40 is externally mounted across the rubber sleeve 57 and the flange 54 on the corresponding shaft 50 and overlaps these parts in the radial direction.

The left and right housing halves 5*a*, 5*b* are thus fastened with the shafts 50 and the nuts 51 with each rubber ring 40 between the corresponding receiver 60 and guide cylinder 31.

The left and right rubber sheets 41 are also between the rear housing 6 and the front grip 20 in front of the shafts 50.

In the grinder 1A, the tip tool 18 and the motor 8 may cause vibration during operation. However, the rubber rings 40 and the rubber sheets 41 are between the motor housing 2 and the grip housing 5. This reduces vibration transmitted to the grip housing 5. This allows the operator to feel less discomfort in the hand from such vibration.

Each rubber ring 40 is located between the corresponding guide cylinder 31 on the motor housing 2 and either the left receiver 60 or the right receiver 60 on the grip housing 5 in the axial direction of the shaft 50. This allows the screw fastening portions not to be larger in the radial direction with the rubber rings 40.

Each rubber sleeve 57 is located between the corresponding guide cylinder 31 in the rear housing 6 and the shaft 50. This also reduces vibration transmitted from the rear housing 6 to the grip housing 5 through the shafts 50.

The grinder 1A according to the second embodiment includes the motor housing 2 accommodating the motor 8, the pair of housing halves 5*a* and 5*b* screwed together across the motor housing 2, the shafts 50 having two ends including the threaded portions 52 and extending through the guide cylinders 31 in the motor housing 2, the pair of nuts 51 held in the pair of housing halves 5*a* and 5*b* and screwed onto the threaded portions 52, and the rubber sleeves 57 (elastic members) between each guide cylinder 31 and either the housing half 5*a* or the housing half 5*b*.

This structure allows effective reduction of vibration while maintaining the compact product size.

Each rubber sleeve 57 is between the outer circumference of the corresponding shaft 50 and guide cylinder 31.

This reduces vibration transmitted to the grip housing 5 through the shafts 50 to enhance the vibration reduction effect.

The spindle 16 (output shaft) is in front of the motor housing 2. The housing halves 5*a* and 5*b* are a pair of left and right housings. Each shaft 50 extends through the corresponding guide cylinder 31 in the lateral direction. The grinder 1A includes the rubber ring 40 (second elastic member) in the axial direction of the shaft 50 between each of the left housing half 5*a* and the right housing half 5*b* and the corresponding guide cylinder 31 on the left and right of the guide cylinder 31. Each rubber ring 40 overlaps the corresponding rubber sleeve 57 in the radial direction of the shaft 50.

This structure produces a laterally balanced vibration reduction effect. The overlap between each rubber ring 40 and the corresponding rubber sleeve 57 produces a high vibration reduction effect.

The grinder 1A includes the rubber sheet 41 (third elastic member) between each of the left housing half 5*a* and the right housing half 5*b* and the motor housing 2 on the left and right of the motor housing 2.

This structure produces a higher vibration reduction effect.

In the second embodiment, the shafts are not limited to a pair of upper and lower shafts. The number of shafts may be one, three, or more. The installation position of the shaft is not limited to the rear surface of the motor housing, but may be on the upper or lower surface of the motor housing.

The shaft may not be locked in a nonrotatable manner with the receiver. The shaft may be locked in a nonrotatable manner with the motor housing using, for example, flat edges in the through-hole in the guide cylinder.

Each rubber sleeve may not overlap the corresponding rubber ring in the radial direction of the shaft. Each rubber sleeve may be split in the axial direction.

In the present embodiment, screw fastening is performed using the shafts, the nuts, and the rubber rings in the front grip alone, but the similar screw fastening may be performed at other positions such as in the middle grip.

The elastic member such as the rubber sleeve, the second elastic member such as the rubber ring, and the third elastic member such as the rubber sheet may also be formed from a material other than rubber. The second and third elastic members may be eliminated.

Third Embodiment

Figure 11:
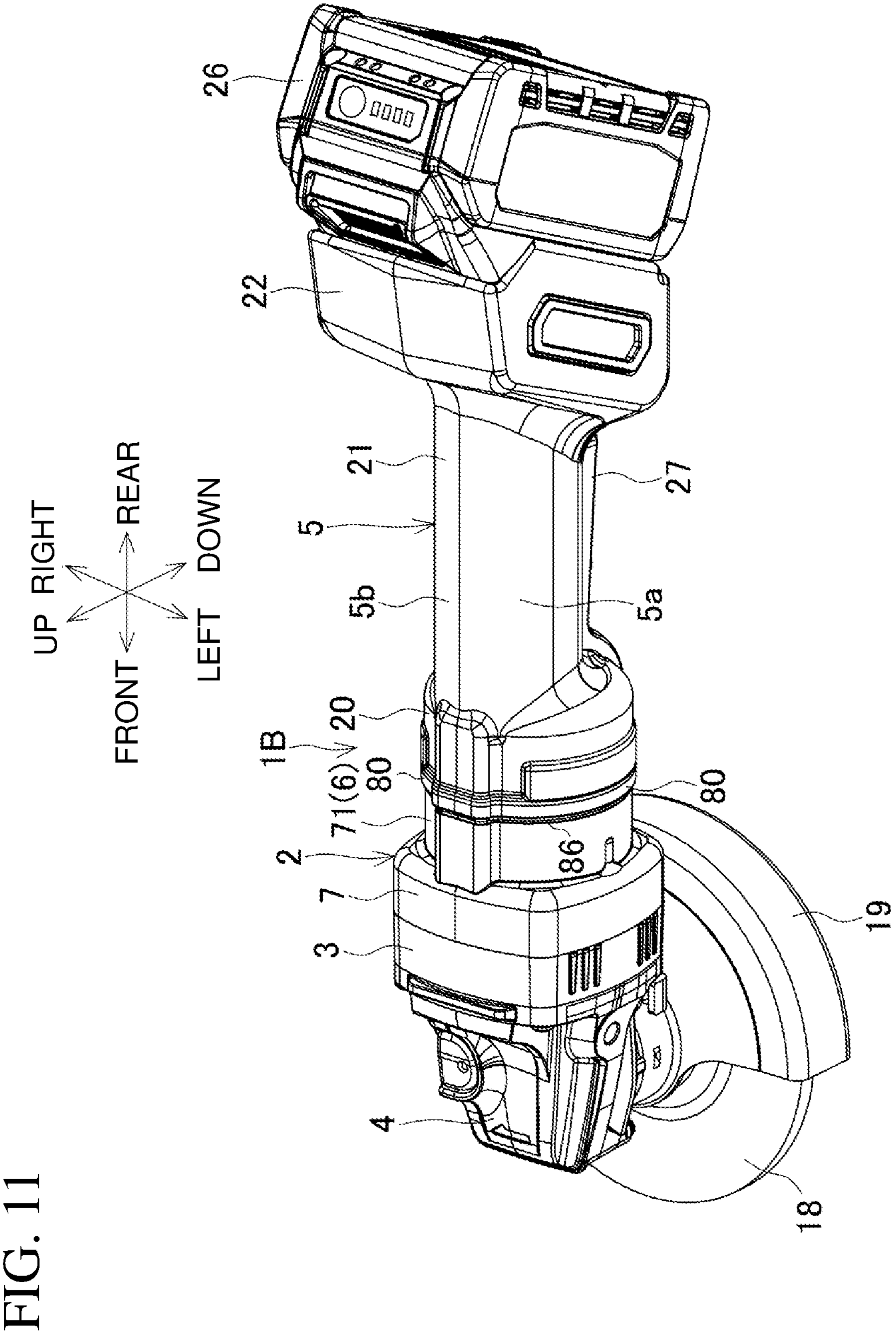
FIG. 11 is a perspective view of a grinder according to a third embodiment.
Figure 12:
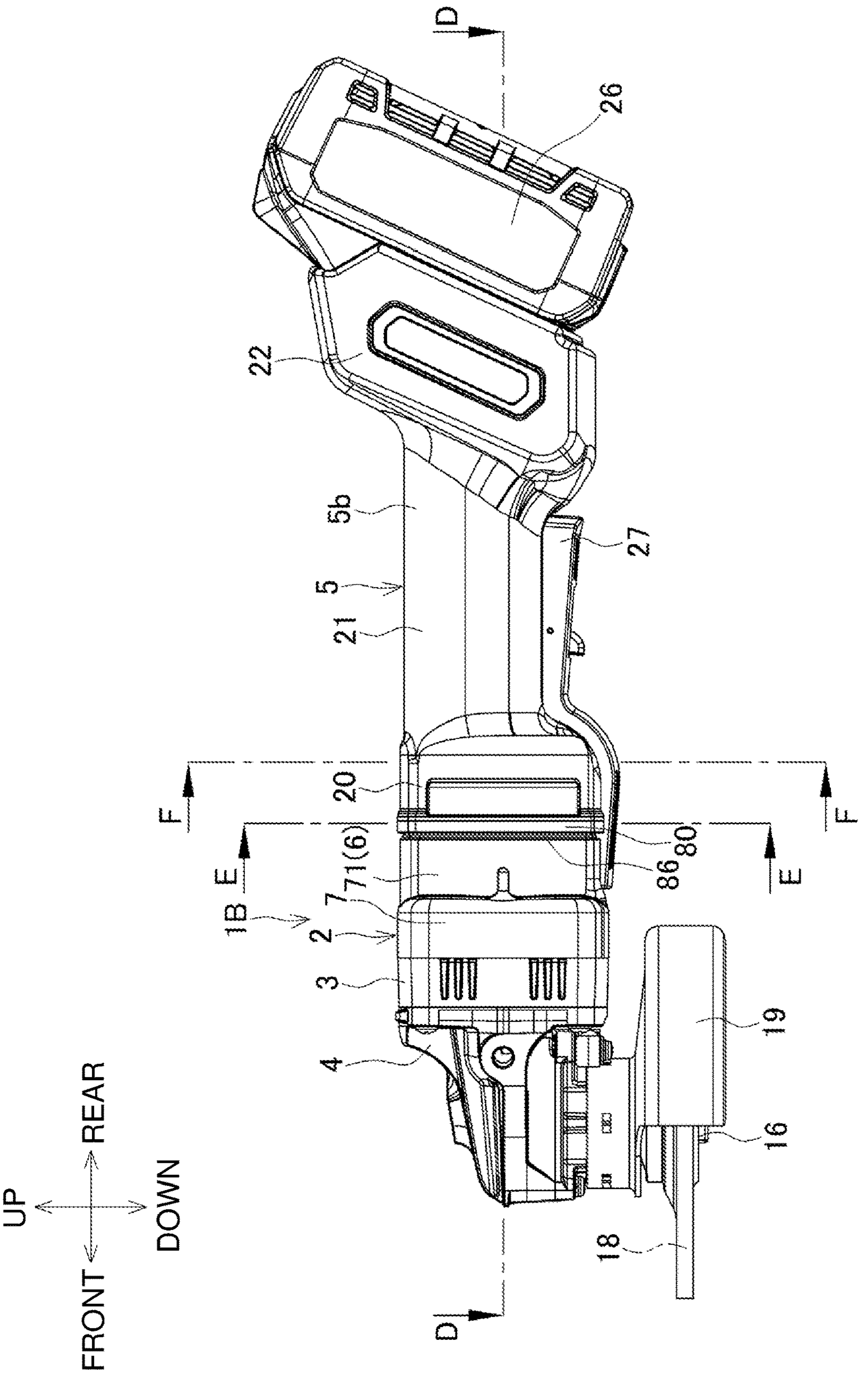
FIG. 12 is a side view of the grinder according to the third embodiment.
Figure 13:
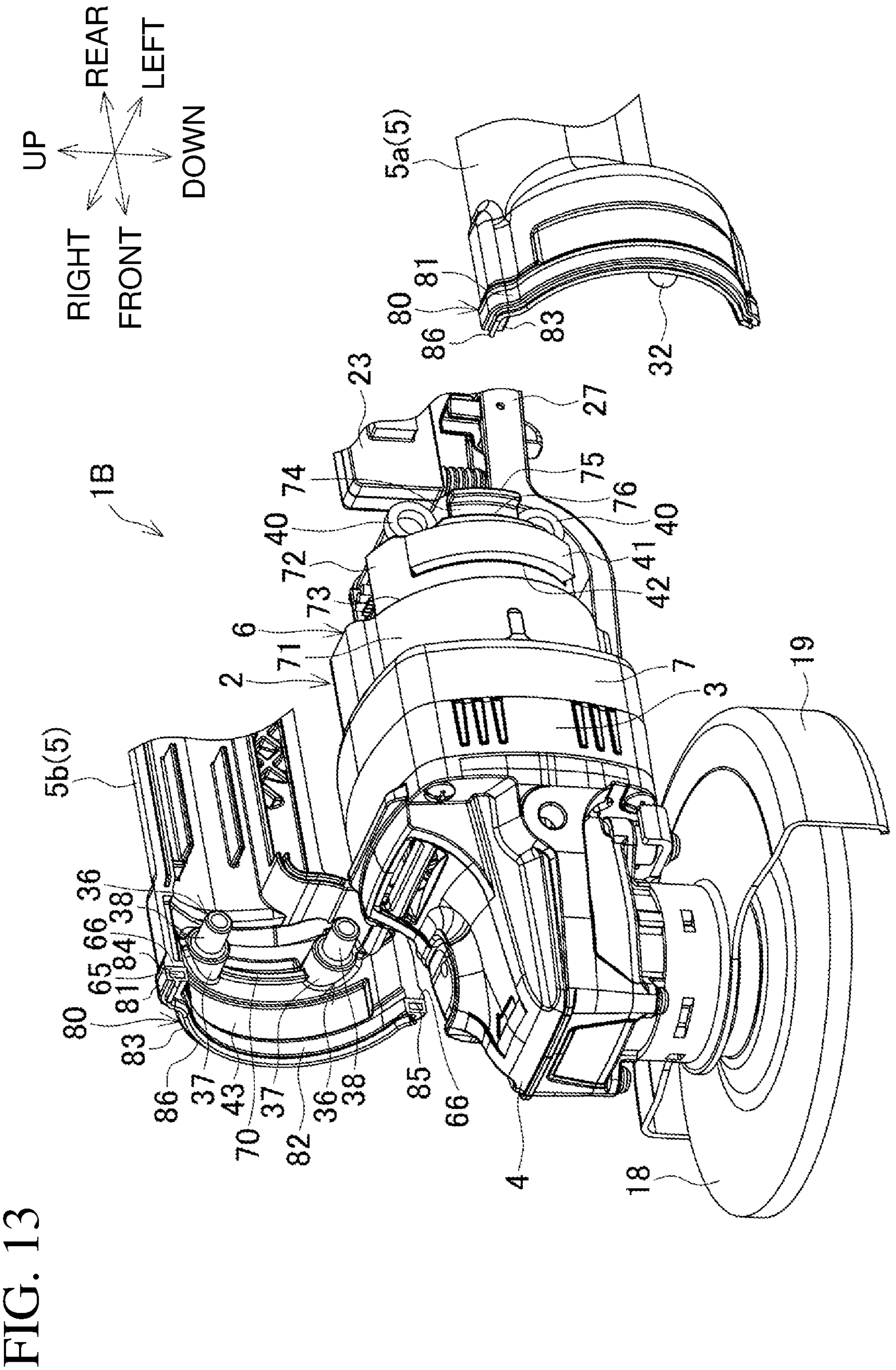
FIG. 13 is an exploded perspective view of a front portion of a grip housing.

FIG. 11 is a perspective rear view of a grinder 1B. FIG. 12 is a side view of the grinder 1B. FIG. 13 is an exploded perspective view of a front portion of a grip housing.

Figure 16:
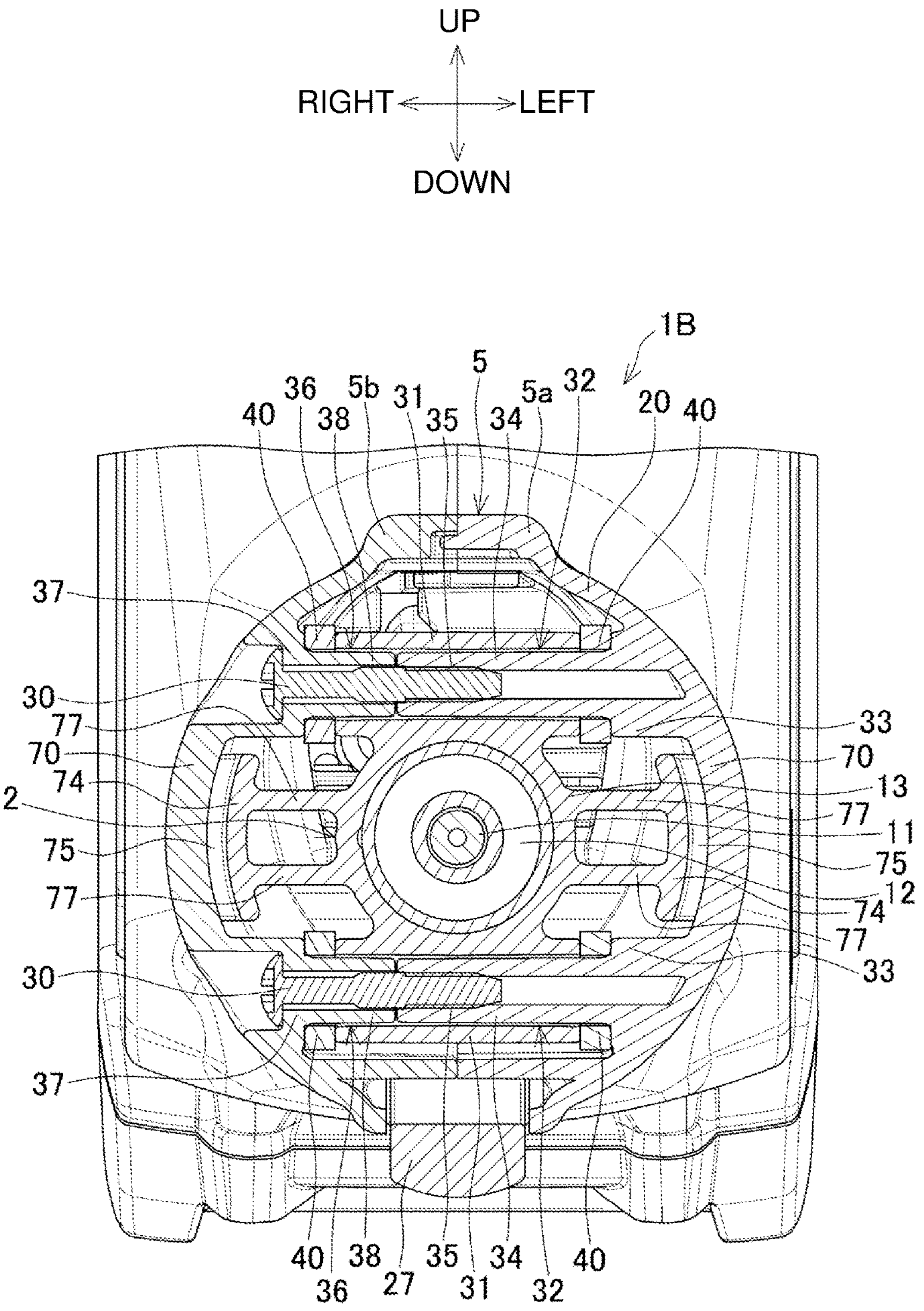
FIG. 16 is an enlarged sectional view taken along line F-F in FIG. 12.

The grinder 1B according to the present embodiment also has the same structure for vibration reduction as the grinder 1 according to the first embodiment. In other words, as shown in FIG. 16, the screw fastening between the housing halves 5*a* and 5*b* in the front grip 20 is performed with the left screw bosses 32 on the housing half 5*a* and the right screw bosses 36 on the housing half 5*b* extending through the guide cylinders 31 in the motor housing 2 and with the rubber ring 40 between each of the left screw boss 32 and the right screw boss 36 and the corresponding guide cylinder 31 in the axial direction of the left and right screw bosses 32 and 36.

The rubber sheet 41 is between each of the left housing half 5*a* and the right housing half 5*b* and the motor housing 2 on the left and right of the motor housing 2.

The grinder 1B in the present embodiment differs from the grinder 1 in the first embodiment in its sealing structure to seal the gap between the motor housing 2 and the grip housing 5.

Figure 14:
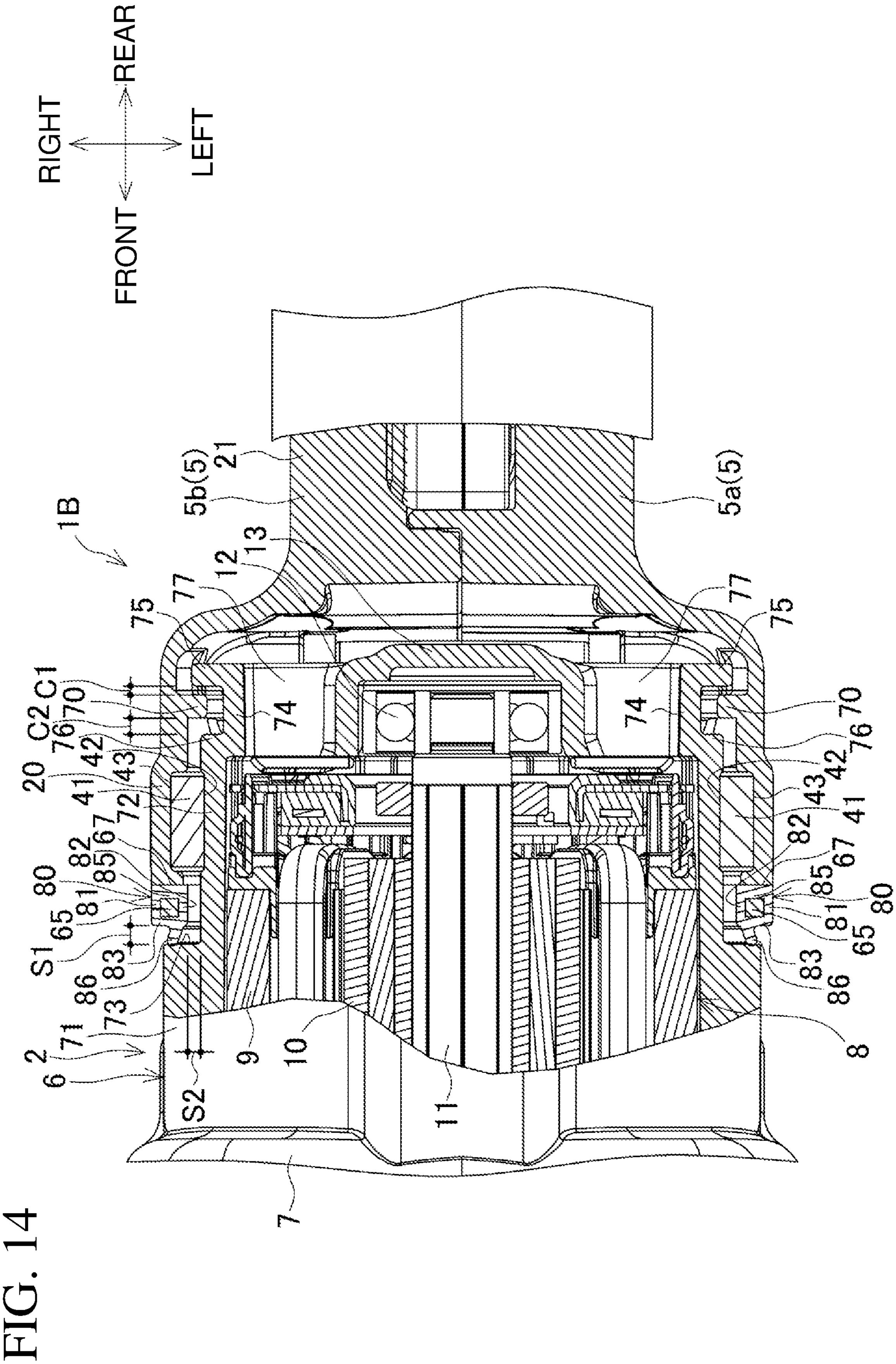
FIG. 14 is an enlarged partial sectional view taken along line D-D in FIG. 12.
Figure 15:
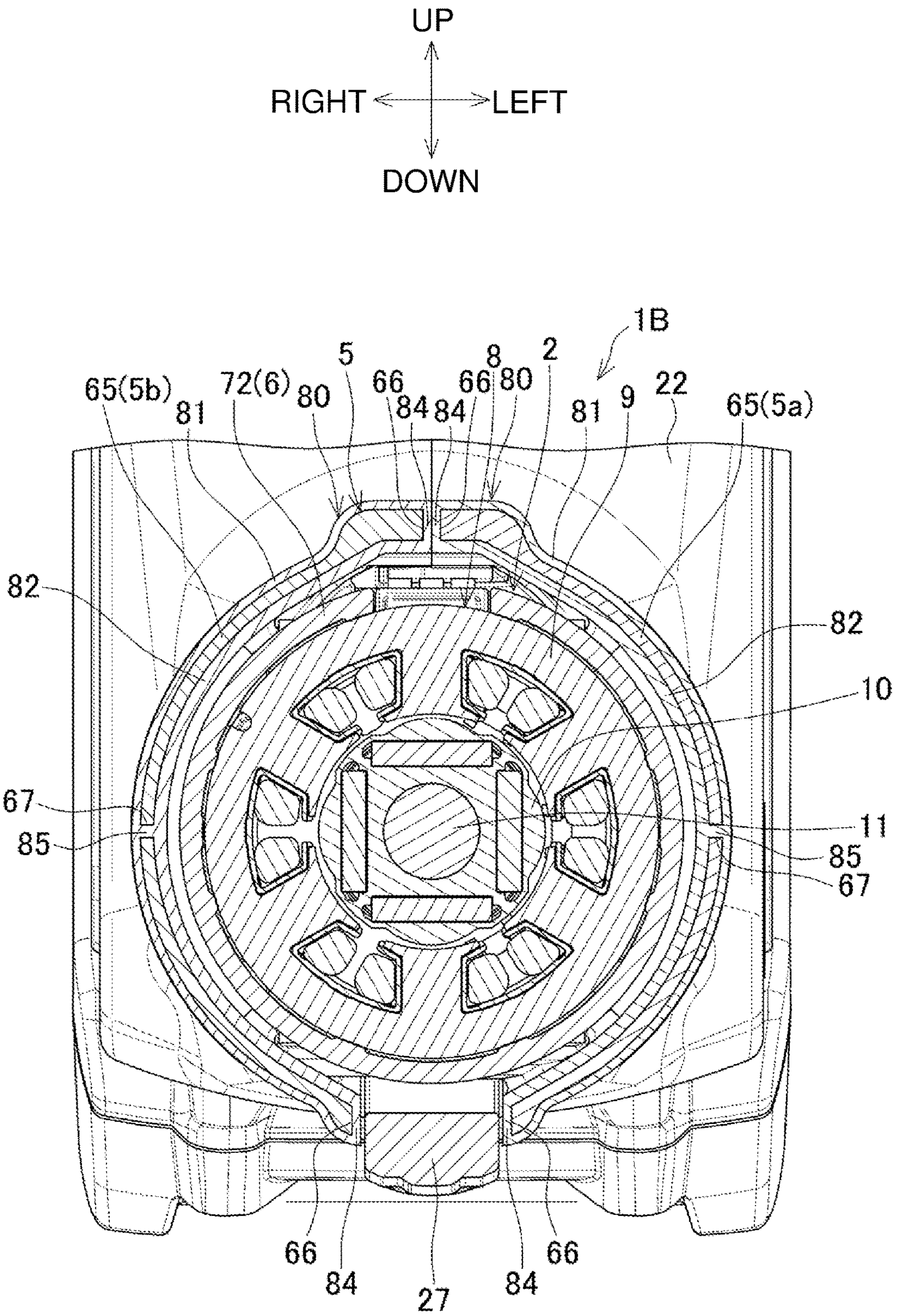
FIG. 15 is an enlarged sectional view taken along line E-E in FIG. 12.

The housing halves 5*a* and 5*b* each has a front end 65 that is semicircular as viewed from the front. Each front end 65 is fully covered with an elastomer member 80 along its periphery. Each elastomer member 80 has an outer surface 81, an inner surface 82, and a front surface 83 as shown in FIGS. 14 and 15. The outer surface 81 covers the outer surface of the front end 65. The inner surface 82 covers the inner surface of the front end 65. The front surface 83 covers the front surface of the front end 65.

The front end 65 has cutouts 66 at two ends in the circumferential direction. The front end 65 has a through-hole 67 extending in the radial direction at a circumferentially middle position. The outer surface 81 and the inner surface 82 are connected to each other with connectors 84 at the two ends in the circumferential direction. The connectors 84 are formed from an elastomer that fills the cutouts 66. The outer surface 81 and the inner surface 82 are connected to each other with a connector 85 at a circumferentially middle position. The connector 85 is formed from an elastomer that fills the through-hole 67.

The front surface 83 receives a seal 86. The seal 86 protrudes frontward from a radially inward portion of the front surface 83 and extends as a strip along the full length of the front surface 83 in the circumferential direction.

An outer stopper 70 is between the left screw bosses 32 on the inner surface of the housing half 5*a*. The outer stopper 70 is a ridge extending circumferentially. Similarly, another outer stopper 70 is between the right thread bosses 36 on the inner surface of the housing half 5*b*. The other outer stopper 70 extends circumferentially.

The rear housing 6 in the motor housing 2 includes a front half 71 and a rear half 72. The front half 71 connects to the front housing 7. The rear half 72 receives the grip housing 5. The rear half 72 has a smaller diameter than the front half 71. The front half 71 has an annular opposing surface 73 on its rear surface. The opposing surface 73 faces the front end of the grip housing 5.

A pair of restrictors 74 are located on both the left and right at the rear surface of the rear housing 6. Each restrictor 74 protrudes rearward. The restrictor 74 aligns with the corresponding outer stopper 70 on the housing half 5*a* or on the housing half 5*b* and is located radially inward from the corresponding outer stopper 70. An inner stopper 75 is at the rear end of each restrictor 74. The inner stopper 75 is a ridge extending circumferentially. The inner stopper 75 protrudes rearward and radially outward from the corresponding outer stopper 70 and overlaps the outer stopper 70 in the front-rear direction. Steps 76 are formed in front of the outer stoppers 70 and on the left and right of the rear surface of the rear housing 6. Each step 76 is located radially outward from the corresponding restrictor 74. Each step 76 overlaps the corresponding outer stopper 70 in the front-rear direction. A pair of upper and lower ribs 77 are arranged symmetrically on the rear surface of the rear housing 6. The ribs 77 connect the bearing retainer 13 and the restrictors 74.

In the grinder 1B, as in the first embodiment, the front grip 20 is screwed to the rear half 72 of the rear housing 6 to assemble the housing halves 5*a* and 5*b* together. The front ends 65 of the housing halves 5*a* and 5*b* and the elastomer members 80 are in contact with each other at their upper ends. The lower ends of the front ends 65 and the elastomer members 80 are close to the side surfaces of the switch lever 27. Each seal 86 protruding frontward has a length greater than a gap 51 (FIG. 14) between the opposing surface 73 of the front half 71 and the front surface 83 of the corresponding elastomer member 80 in the front-rear direction. The front end of each seal 86 in contact with the opposing surface 73 deforms outward and contracts in the front-rear direction. The gap 51 between the front surface 83 and the opposing surface 73 is sealed with the corresponding seal 86. In this assembled state, a gap S2 is defined between the rear half 72 and the inner surface 82 of the corresponding seal 86 in the radial direction.

The outer stoppers 70 on the housing halves 5*a* and 5*b* each are located between the step 76 on the rear surface of the rear housing 6 and the inner stopper 75 on the restrictor 74 in the front-rear direction. This allows the motor housing 2 and the grip housing 5 to move back and forth relative to each other in a range in which the outer stoppers 70 come into contact with the inner stoppers 75 and the steps 76. In the assembled state, a clearance C1 between each outer stopper 70 and the corresponding inner stopper 75 in the front-rear direction is smaller than a clearance C2 between each outer stopper 70 and the corresponding step 76 in the front-rear direction. The clearance C2 is smaller than the gap S1.

In the grinder 1B as well, the rubber rings 40 and the rubber sheets 41 between the motor housing 2 and the grip housing 5 reduce vibration transmitted to the grip housing 5. This allows the operator to feel less discomfort in the hand from such vibration.

The elastomer members 80 in the grip housing 5 include the seals 86 in contact with the motor housing 2 to seal the gap S1. This reduces the likelihood that dust and foreign matter enter the gap S1. Although the motor housing 2 vibrates and moves back and forth against the grip housing 5, the seals 86 elastically deform and follow the movement to maintain the sealing performance. The inner surfaces 82 of the elastomer members 80 are not in contact with the motor housing 2 with the gap S2 in between. This reduces the likelihood that any vibration of the motor housing 2 is transmitted to the grip housing 5 through the elastomer members 80.

When the grip housing 5 moves backward relative to the motor housing 2 and the distance of movement reaches the clearance C1 between the outer stopper 70 and the inner stopper 75, the outer stopper 70 and the inner stopper 75 come into contact with each other to restrict relative movement beyond the clearance C1. When the grip housing 5 moves forward relative to the motor housing 2 and the distance of movement reaches the clearance C2 between the outer stopper 70 and the step 76, the outer stopper 70 and the step 76 come into contact with each other to restrict relative movement beyond the clearance C2. However, in the forward relative movement of the grip housing 5, the seals 86 are compressed in the gap S1. Depending on the length and the thickness of the seals 86, the relative movement is restricted with elastic deformation of the seals 86 before the distance of movement reaches the clearance C2.

Although a high load may be applied due to a drop or another impact, the load does not concentrate on the left and right screw bosses 32 and 36 but can be distributed from both the stoppers 70 and 75 to the motor housing 2 and the grip housing 5. This effectively reduces the likelihood of damage to the left and right screw bosses 32 and 36.

The grinder 1B according to the third embodiment also has the same effects as in the first embodiment, such as effective reduction of vibration while maintaining the compact product size.

In particular, the elastomer members 80 (examples of an elastic body) cover the outer surfaces of the housing halves 5*a* and 5*b*. Each elastomer member 80 includes the seal 86 protruding toward the motor housing 2 and in contact with the motor housing 2 to seal between the motor housing 2 and the grip housing 5.

This effectively reduces the likelihood that dust and foreign matter enter, although the gap S1 is defined between the motor housing 2 and the grip housing 5 for vibration isolation. In particular, the elastomer members 80 covering the outer surfaces of the housing halves 5*a* and 5*b* serve as the seals 86. This allows the seals 86 to be easily obtained at low cost.

The seals 86 are located in the housing halves 5*a* and 5*b*. This allows the seals 86 to be integral with the housing halves 5*a* and 5*b* during manufacture.

The seals 86 extend toward the motor housing 2 and are in contact with the motor housing 2 to have high sealing performance against the motor housing 2 in which vibration occurs.

The motor housing 2 and the housing halves 5*a* and 5*b* include the outer stoppers 70, the inner stoppers 75, and the steps 76 (examples of movement regulators) that come into contact with each other when the motor housing 2 and the housing halves 5*a* and 5*b* move relative to each other by a predetermined distance.

This reduces the likelihood of damage to the left and right screw bosses 32 and 36 due to an impact such as a drop.

In the third embodiment, the connection using the elastomer members at the front surface and the back surface of the housing halves is not limited to the example described above. For example, the number of through-holes may be increased, or either the cutouts or the through-holes may be eliminated.

The outer surfaces of the elastomer members may extend toward the rear of the housing halves. At least either the inner surface or the front surface may be eliminated. In this case, the seal may extend continuously from the outer surface.

Multiple seals (e.g., dual seals) may be in contact with the motor housing in the radial direction.

In the example described above, the elastomer members and the seals are located on the housing halves, but may be located on the motor housing to cause the seals to be in contact with the front ends of the housing halves.

An elastic body forming the seals is not limited to an elastomer.

The structure of the seal is not limited to the vibration reduction structure in the first embodiment, but may be used as the vibration reduction structure in the second embodiment.

The structure of the seal is also similarly usable for a power tool that includes a first housing and a second housing movable relative to the first housing to be assembled together, with a gap between the first housing and the second housing in the assembled state with an elastic body covering the outer surface of either the first housing or the second housing. In other words, when the elastic body includes the seals between the two housings, the seals can be easily formed using the elastic body. This structure effectively reduces the likelihood of foreign matter to enter between the housings.

In this case as well, the elastic body may be located on the inner surface of the housing and extend through the housing in the thickness direction to be connected on the front surface and the back surface of the housing.

The structure of the movement regulator may also be modified as appropriate.

For example, the outer stopper may be circumferentially shortened or may include multiple circumferentially aligned protrusions. The inner stopper may also be lengthened circumferentially or may include multiple circumferentially aligned protrusions. The step may be replaced with a ridge or a protrusion protruding circumferentially on the outer surface of the restrictor.

The restrictor may be eliminated, and a pair of inner stoppers in front of and behind the outer stoppers may be located on the outer surface of the motor housing.

The movement regulator is not limited to a structure with the outer stopper, the inner stopper, and the step. For example, circumferential grooves may be formed on the inner surfaces of the housing halves and circumferential ribs may be arranged on the outer surface of the motor housing to be received in the grooves. In this case as well, the relative movement range of the two housings can be regulated by causing ribs to come into contact with the front and rear inner surfaces of the grooves.

In each of the above embodiments, the grinder may be an alternating current (AC) tool that uses utility power instead of a direct current (DC) tool that uses a battery pack.

The motor is not limited to a brushless motor.

The grinding tool is not limited to a grinder. The grinding tool may be another grinding tool such as a sander or a polisher.

The screw fastening direction between the housing halves is not limited to the lateral direction. For example, the present disclosure is usable for the housing halves that are split vertically.

The housing halves may be symmetrical or asymmetrical.

REFERENCE SIGNS LIST

1, 1A, 1B grinder
2 motor housing
4 gear housing
5 grip housing
5*a*, 5*b* housing half
6 rear housing
7 front housing
8 motor
11 rotational shaft
16 spindle
18 tip tool
20 front grip
30 screw
31 guide cylinder
32 left screw boss
33 left larger-diameter portion
34 left smaller-diameter portion
36 right screw boss
37 right larger-diameter portion
38 right smaller-diameter portion
40 rubber ring
41 rubber sheet
50 shaft
51 nut
52 threaded portion
57 rubber sleeve
60 receiver
65 front end
66 cutout
67 through-hole
70 outer stopper
73 opposing surface
74 restrictor
75 inner stopper
76 step
80 elastomer member
81 outer surface
86 seal
S1, S2 gap
C1, C2 clearance

What is claimed is:

1. A grinding tool, comprising:
a motor housing accommodating a motor;
an output shaft in front of the motor housing;
a guide cylinder disposed on a rear surface of the motor housing, the guide cylinder extending in a lateral direction;
a left housing half including a left screw boss, the left screw boss including
a left larger-diameter portion on a left basal end, the left larger-diameter portion having the same diameter as the guide cylinder, and
a left smaller-diameter portion located rightward from the left larger-diameter portion, the left smaller-diameter portion received in the guide cylinder;
a right housing half screwed together with the left housing half, the right housing half including a right screw boss, the right screw boss including
a right larger-diameter portion on a right basal end, the right larger-diameter portion having the same diameter as the guide cylinder, and
a right smaller-diameter portion located leftward from the right larger-diameter portion, the right smaller-diameter portion received in the guide cylinder such that end faces of the left smaller-diameter portion and the right smaller-diameter portion are close to or in contact with each other; and
elastic members each disposed between the guide cylinder and the left larger-diameter portion in an axial direction of the left screw boss, and between the guide cylinder and the right larger-diameter portion in an axial direction of the right screw boss,
wherein
the axial direction of the screw bosses is a lateral direction of the motor housing,
the elastic members are on a left and a right of the motor housing, and
the elastic members and the guide cylinder have the same outer diameter.

2. The grinding tool according to claim 1, wherein
each of the left housing half and the right housing half includes two of the screw bosses arranged in a vertical direction of the motor housing.

3. The grinding tool according to claim 2, wherein
the motor housing is cylindrical.

4. The grinding tool according to claim 2, further comprising:
second elastic members disposed between the left housing half and the motor housing on a left of the motor housing, and between the right housing half and the motor housing on a right of the motor housing.

5. The grinding tool according to claim 1, wherein
the motor housing is cylindrical.

6. The grinding tool according to claim 5, further comprising:
second elastic members disposed between the left housing half and the motor housing on a left of the motor housing, and between the right housing half and the motor housing on a right of the motor housing.

7. The grinding tool according to claim 1, further comprising:
second elastic members disposed between the left housing half and the motor housing on a left of the motor housing, and between the right housing half and the motor housing on a right of the motor housing.

8. The grinding tool according to claim 1, wherein
the motor housing and each of the left housing half and the right housing half include stoppers configured to come into contact with each other when the motor housing and each of the left housing half and the right housing half move relative to each other by a predetermined distance.

9. The grinding tool according to claim 1, further comprising:
an elastomer member on an outer surface of either: (i) the motor housing or (ii) the left housing half and the right housing half, and covering the outer surface,
wherein the elastomer member includes a seal between the motor housing and each of the left housing half and the right housing half.

10. The grinding tool according to claim 9, wherein
the left housing half and the right housing half includes the elastomer member and the seal.

11. The grinding tool according to claim 10, wherein
the seal extends toward the motor housing and is in contact with the motor housing.

12. The grinding tool according to claim 1, further comprising:
the motor having a rotational shaft;
a bearing holding the rotational shaft,
wherein
the guide cylinder includes an upper guide cylinder and a lower guide cylinder extending in the lateral direction, the upper guide cylinder is disposed above the bearing and the lower guide cylinder is disposed below the bearing such that the bearing is overlapped with the upper guide cylinder and the lower guide cylinder in a vertical direction.

13. The grinding tool according to claim 1, wherein
each of the elastic members is a rubber ring.

14. A grinding tool, comprising:
a motor housing accommodating a motor;
a guide cylinder disposed on a rear surface of the motor housing, the guide cylinder extending in a lateral direction of the motor housing;
a shaft having two ends including threaded portions, the shaft extending through the motor housing, the shaft including
two flanges, and
a narrow-diameter portion located between the two flanges;
a pair of housing halves screwed together across the motor housing, the pair of housing halves located separated from the motor housing in an axial direction of the shaft;
a pair of nuts held in the pair of housing halves and screwed onto the threaded portions to integrally fix the shaft to the pair of housing halves; and
a rubber sleeve between an outer circumference of the narrow-diameter portion and an inner surface of the guide cylinder such that the shaft is movable relative to the motor housing, the rubber sleeve having the same outer diameter as the flanges.

15. The grinding tool according to claim 14, wherein
the motor housing includes an output shaft in front of the motor housing,
the pair of housing halves are a pair of left and right housing halves,
the shaft extends through the motor housing in the lateral direction of the motor housing,
the grinding tool further comprises rubber rings between each of the pair of housing halves and the motor housing on a left and a right of the motor housing in the axial direction of the shaft, and the rubber rings overlap the rubber sleeve in a radial direction of the shaft.

16. The grinding tool according to claim 15, further comprising:

rubber sheets between each of the pair of housing halves and the motor housing on the left and the right of the motor housing.

17. The grinding tool according to claim 14, further comprising:

the motor having a rotational shaft;

a bearing holding the rotational shaft; and wherein the guide cylinder comprises an upper guide cylinder and a lower guide cylinder disposed on the rear surface of the motor housing, the upper guide cylinder and the lower guide cylinder extending in the lateral direction of the motor housing, the upper guide cylinder disposed above the bearing and the lower guide cylinder disposed below the bearing such that the bearing is overlapped with the upper guide cylinder and the lower guide cylinder in a vertical direction.

* * * * *